US007333992B2

(12) United States Patent
Krishnamoorthy et al.

(10) Patent No.: US 7,333,992 B2
(45) Date of Patent: Feb. 19, 2008

(54) SYSTEM AND METHOD FOR IDENTIFYING AND STORING CHANGES MADE TO A TABLE

(75) Inventors: Ganapathy Krishnamoorthy, Issaquah, WA (US); Wei Xiao, Redmond, WA (US); Nigel R. Ellis, Redmond, WA (US); Rodger N. Kline, Woodinville, WA (US); Sameet H. Agarwal, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 510 days.

(21) Appl. No.: 10/445,095

(22) Filed: May 22, 2003

(65) Prior Publication Data

US 2004/0236763 A1 Nov. 25, 2004

(51) Int. Cl.
*G06F 7/30* (2006.01)
(52) U.S. Cl. ................... 707/100; 707/101; 707/102; 707/103; 707/104.1
(58) Field of Classification Search ............... 707/203, 707/200, 1–4
See application file for complete search history.

(56) References Cited

U.S. PATENT DOCUMENTS

| | | | | |
|---|---|---|---|---|
| 4,425,618 | A * | 1/1984 | Bishop et al. | 712/226 |
| 5,729,744 | A | 3/1998 | Gerken et al. | 707/203 |
| 6,182,086 | B1 | 1/2001 | Lomet et al. | 707/202 |
| 6,275,832 | B1 * | 8/2001 | Watts et al. | 707/203 |
| 6,339,772 | B1 * | 1/2002 | Klein et al. | 707/4 |
| 6,397,227 | B1 * | 5/2002 | Klein et al. | 707/200 |
| 6,453,313 | B1 * | 9/2002 | Klein et al. | 707/3 |
| 6,542,883 | B1 * | 4/2003 | Salo | 707/1 |
| 6,631,374 | B1 * | 10/2003 | Klein et al. | 707/8 |
| 6,636,846 | B1 | 10/2003 | Leung et al. | 707/2 |
| 6,829,616 | B2 * | 12/2004 | Chen et al. | 707/102 |
| 6,882,993 | B1 * | 4/2005 | Lawande et al. | 707/2 |
| 7,076,508 | B2 * | 7/2006 | Bourbonnais et al. | 707/202 |
| 2003/0069902 | A1 | 4/2003 | Narang et al. | 707/203 |
| 2003/0172091 | A1 * | 9/2003 | Norcott | 707/203 |

OTHER PUBLICATIONS

Conradi, R. et al., "Version Models for Software Configuration Management", *ACM Computing Surveys*, 1998, 30(2), 232-282.
Cohen, D., "Compiling Complex Database Transition Triggers", *ACM*, 1989, 225-234.
Dayal, U. et al., "Organizing Long-Running Activities with Triggers and Transactions", *ACM*, 1990, 204-214.
Eswaran, K.P., "Aspects of a Trigger Subsystem in an Integrated Database System", *IBM Research Laboratory*, San Jose, 243-250.

(Continued)

*Primary Examiner*—John Cottingham
*Assistant Examiner*—Michael D Pham
(74) *Attorney, Agent, or Firm*—Woodcock Washburn LLP (57) ABSTRACT

A base table is scanned with a delete marker and an insert marker. The delete marker identifies a last change committed to the base table as part of a transaction prior to execution of a statement, and the insert marker identifies a last change committed to base table as part of the transaction during execution of the statement. The results of the delete marker scan are filtered with deletions stored in a delta table, and a delete table is populated with the filtered rows. The results of the insert scan are filtered with insertions stored in the delta table, and an insert table is populated with the filtered rows.

13 Claims, 9 Drawing Sheets

OTHER PUBLICATIONS

Katz, R.H., "Toward a Unified Framework for Version Modeling in Engineering Databases", *ACM Computing Surveys*, 1990, 22(4), 375-408.

Raschid, L. et al., "Semantics for Update Rule Programs and Implementation in a Relational Database Management System", *ACM Transactions on Database Systems*, 1996, 22(4), 526-571.

Sciore, E., "Using Annotations to Support Multiple Kinds of Versioning in an Object-Oriented Database System", *ACM Transactions on Database Systems*, 1991, 16(3), 417-438.

Adelberg, B. et al., "The STRIP rule System for Efficiently Maintaining Derived Data", *SIGMOD*, 1997, 147-157.

Diaz, O. et al., "EXACT: An Extensible Approach to Active Object-Oriented Databases", *The VLDB Journal*, 1997, 6, 282-295.

Gehani, N.H. et al., "Event Specification in an Active Object-Oriented Database", *ACM SIGMOD*, 1992, 81-90.

Gustaffson, T. et al., "Dynamic On-Demand Updating of Data in Real-time Database Systems", *ACM Symposium on Applied Computing*, 2004, 846-853.

Hanson, E.N. et al., "Timer-Driven Database Triggers and Alerters:, Semantics and a Challenge", *SIGMOD Record*, 1999, 28(4), 11-16.

Llirbat, F. et al., "Eliminating Costly Redundant Computations from SQL Trigger Executions", *SIGMOD*, 1997, 428-439.

Widom, J. et al., "Set-Oriented Production Rules in Relational Database Systems", *ACM*, 1990, 259-270.

* cited by examiner

Base Table 210

Current Version:
Customer ID 104, XID 30, SEQ 4

Version Store 220

Fig. 3e

Base Table 210

Current Version:
Customer ID 105, XID 30, SEQ 5

Version Store 220

SYSTEM AND METHOD FOR IDENTIFYING AND STORING CHANGES MADE TO A TABLE

BACKGROUND OF THE INVENTION

1. Field of the Invention

The present invention is directed to the field of database management, and, more specifically, to identifying rows which are deleted from and inserted into a base table and storing such changes.

2. Description of the Prior Art

In a database management system (DBMS), a current version of data is generally stored in a "base" table. Each row in the base table may be changed. Such a change may be the deletion, insertion, or modification of a row in the base table. A modification is a deletion of a previous version of a row and an insertion of a current version of a row. When a row is changed, the change may be stored in a set of temporary, memory resident "transition" tables. Such a set of transition tables is generally automatically created and managed by the DBMS. The set of transition tables may include a "delete" table, which stores rows deleted from the base table, and an "insert" table, which stores rows inserted into the base table. If a row is modified, the previous version of the row is stored in the delete table, and the current version of the row is stored in the insert table.

The transition tables enable the DBMS to test the effects of changes and to set conditions for trigger actions. Specifically, transition tables extend referential integrity between tables, change data in a base table underlying a particular view, check for errors and take action based on a detected error, and find the difference between the state of a table before and after a change and take action based on the difference.

In conventional DBMS's, transition tables may be populated by fully copying rows in the base table before such rows are changed. Thus, for example, if a row is deleted, a previous version of the row is copied and the copy is then stored in the delete table. A drawback of copying rows is that such copies are expensive to generate and store, particularly if the copied row includes large fields of binary large object (BLOB) data such as, for example, code or images.

Another method of populating transition tables is to scan a log file. However, a drawback of using such a log scan is that BLOB data is often too complex to implement using the log scan. Furthermore, the log scan requires usage of disk input/output (IO).

Thus, there is a need in the art for systems and methods that efficiently identify and store changes made to a table. It is desired that such systems and methods enable rows including large amounts of BLOB data to be inexpensively identified and stored in an appropriate transition table. It is further desired that such systems and methods operate without inefficient use of disk IO.

SUMMARY OF THE INVENTION

Accordingly, systems and methods for identifying and storing changes made to a table are disclosed. A current version of data is stored in a base table. Previous versions of each row in the base table are stored in a version store. A delta table identifies the primary key of changes made to the base table and specifies whether such changes are insertions or deletions. A set of transition tables store each change made to the base table. The set of transition tables may include a delete table, which stores rows deleted from the base table, and an insert table, which stores rows inserted into the base table.

When a row is committed to the base table, the row is preferably assigned a transaction identifier (XID) and sequence number (SEQ). The XID is a unique identifier of the transaction in which the change is made. The SEQ is preferably a monotonically increasing value assigned to each change made within a transaction. A previous version of a row in the version store may be identified by the XID and SEQ of the current version of the row in the base table.

The transition tables may be populated by identifying rows changed by a statement as part of a transaction. The base table is scanned with a delete marker and an insert marker. The delete marker identifies a last change committed to the base table as part of the transaction prior to execution of the statement, and the insert marker identifies a last change committed to base table as part of the transaction during execution of the statement. The results of the delete marker scan are filtered with the deletions stored in the delta table, and the delete table is populated with the filtered rows. The results of the insert scan are filtered with the insertions stored in the delta table, and the insert table is populated with the filtered rows.

BRIEF DESCRIPTION OF THE DRAWINGS

The illustrative embodiments will be better understood after reading the following detailed description with reference to the appended drawings, in which.

DETAILED DESCRIPTION

Systems and methods that meet the above-mentioned objects and provides other beneficial features in accordance with the presently preferred exemplary embodiments of the invention will be described below with reference to aforementioned Figures. Those skilled in the art will readily appreciate that the description given herein with respect to those figures is for explanatory purposes only and is not intended in any way to limit the scope of the invention. Throughout the description, like reference numerals will refer to like elements in the respective figures.

Computer Environment

Figure 1:
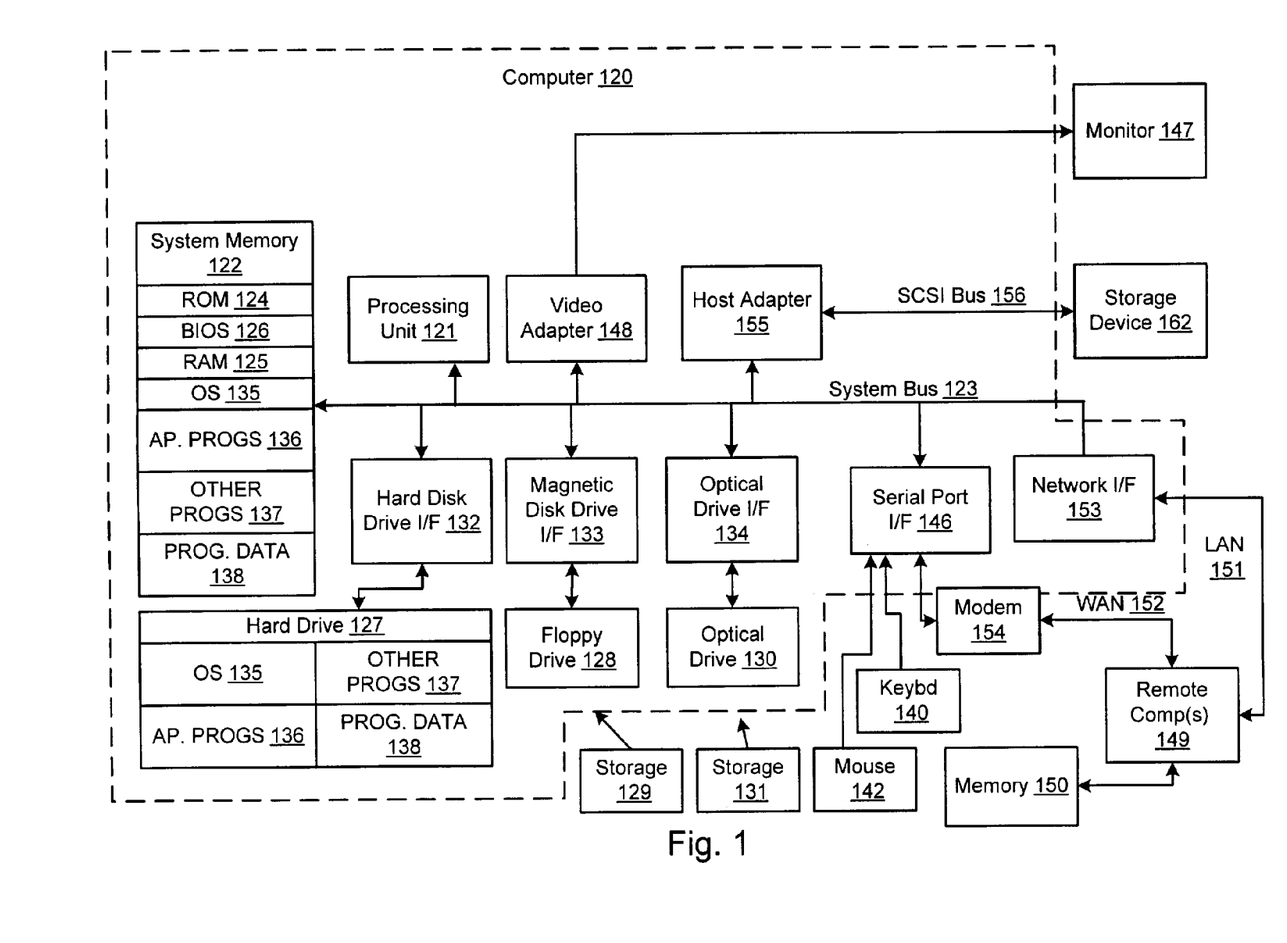
FIG. 1 is a block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation or a server. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142 such as a mouse. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

Exemplary Systems and Methods of the Present Invention

Generally, a current version of data is stored in a base table. Previous versions of each row in the base table are stored in a version store. A delta table identifies the primary key of changes made to the base table and specifies whether such changes are insertions or deletions. A set of transition tables store each change made to the base table. The set of transition tables may include a delete table, which stores rows deleted from the base table, and an insert table, which stores rows inserted into the base table.

Figure 2:
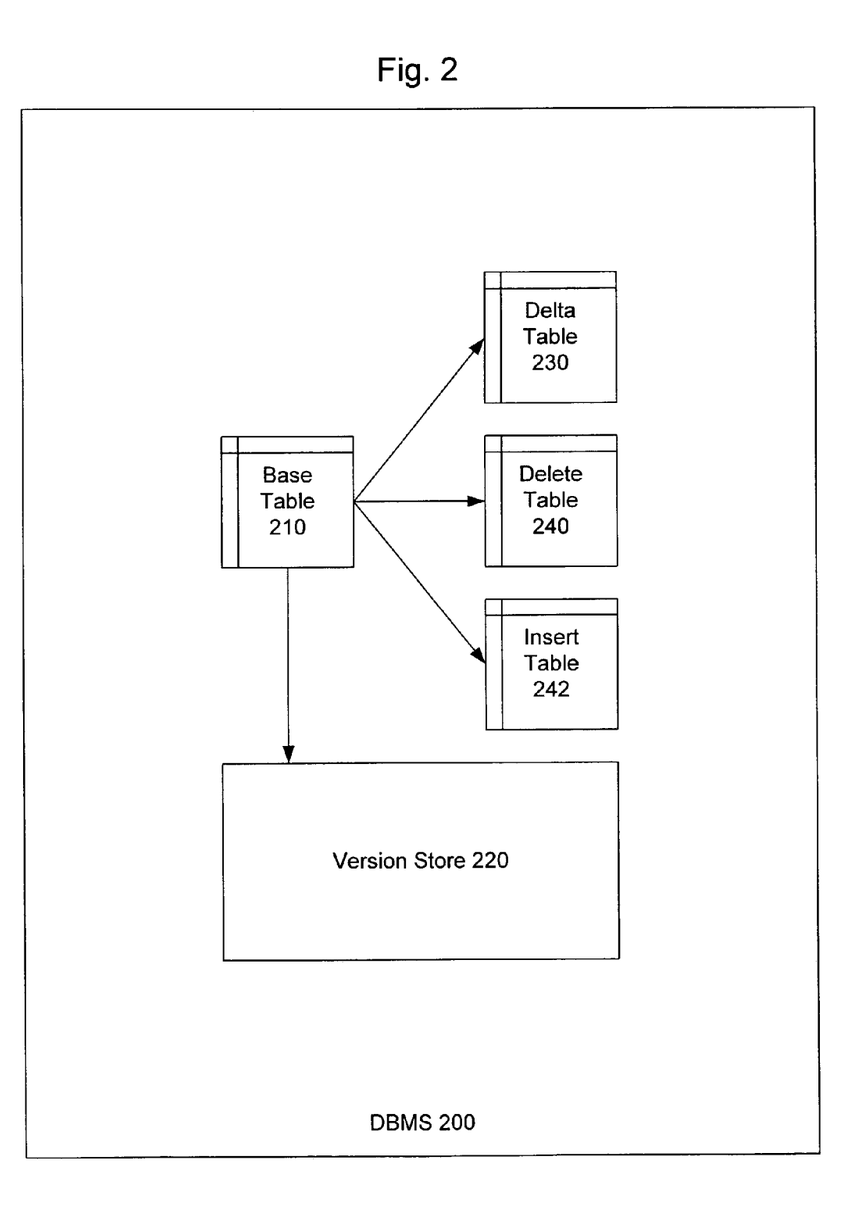
FIG. 2 is a block diagram of an exemplary database management system in accordance with the present invention.

An exemplary database management system (DBMS) in accordance with the present invention is shown in FIG. 2. As shown, DBMS 200 includes base table 210, version store 220, delta table 230, and a set of transition tables 240 and 242 including delete table 240 and insert table 242. A current version of data is stored in base table 210. As should be appreciated, although only a single base table 210 is shown, DBMS 200 may include any number of additional base tables. Base table 210 preferably includes data columns, a transaction identifier (XID) column, and sequence number (SEQ) column. The data columns store substantive data. The XID column stores an identifier of a transaction in which the current version of each row was committed. The SEQ column identifies the sequence in which changes are made within a transaction. The SEQ is preferably a monotonically increasing value that is automatically maintained by DBMS 200. As should be appreciated not every base table in DBMS 200 need include XID and SEQ columns. Desirably, base tables storing changes to be identified in accordance with the present invention need include such XID and SEQ columns. An exemplary base table 210 is shown below in table 1:

TABLE 1

| Customer ID | Name | XID | SEQ |
|---|---|---|---|
| 101 | Andy | 30 | 1 |
| 102 | Bob | 30 | 2 |
| 103 |  | 30 | 3 |
| 104 | Dave | 30 | 4 |
| 105 | Ed | 30 | 5 |

Table 1 includes data columns "Customer ID" and "Name", which store substantive data relating to customers. Rows 101-105 were committed as part of transaction "30". Row 103is a ghost record, which is a record that has been deleted. Thus, although row 103 remains in Table 1 as a placeholder, there is no corresponding "Name" data for row 103.

Version store 220 stores previous versions of rows in base table 210. Rows in version store 220 are indexed by the XID and SEQ of the version of the row by which they were replaced. Thus, the XID and SEQ values of each current row serve as pointers to the previous versions. An exemplary table illustrating rows in a version store 220 is shown below in Table 2:

TABLE 2

| Change XID | Change SEQ | Customer ID | Name | XID | SEQ |
|---|---|---|---|---|---|
| 30 | 3 | 103 | Chris | 20 | 3 |
| 30 | 2 | 102 | Betty | 20 | 2 |
| 30 | 1 | 101 | Alex | 20 | 1 |
| 20 | 1 | 101 | Adam | 10 | 1 |

Table 2 is indexed by the columns "Change XID" and "Change SEQ", which identify the identify change XID and change SEQ values of each row. For example, the current version of row 101, shown in Table 1, is assigned XID 30 and SEQ 1. A first previous version of row 101, which was replaced by the current version, is shown in Table 2 with Change XID 30 and Change SEQ 1. The first previous version is assigned XID 20 and SEQ 1, and, therefore, was committed as part of transaction 20. A second previous version of row 101, which was replaced by the first previous version, is shown in Table 3 with Change XID 20 and Change SEQ 1. The second previous version is assigned XID 10 and SEQ 1, and, therefore, was committed as part of transaction 10.

Figure 3A:
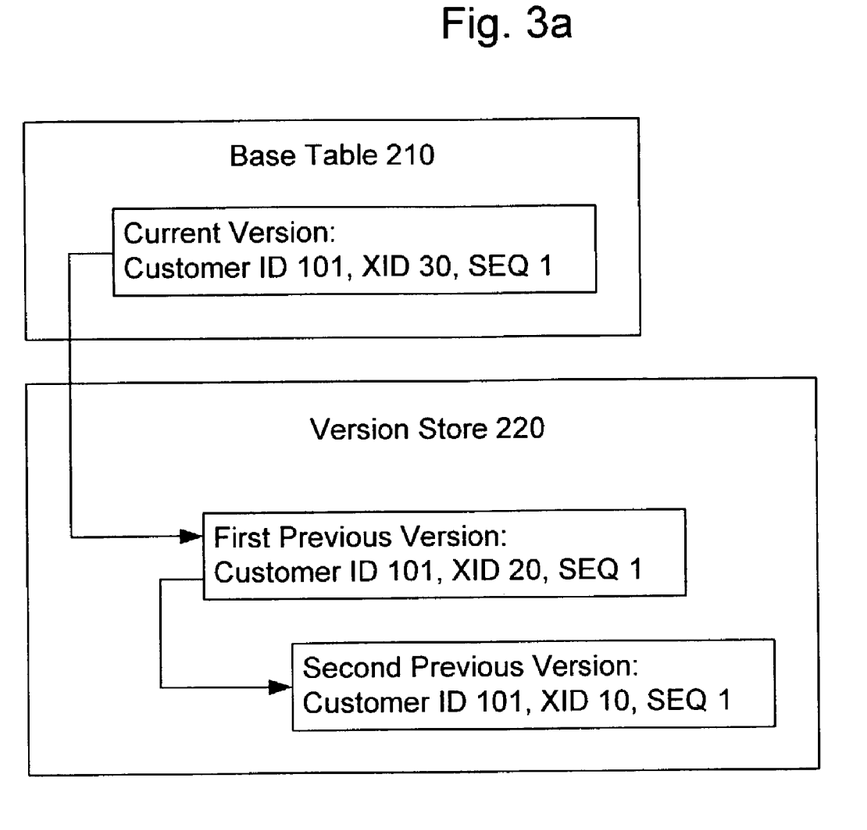
FIGS. 3a-e are block diagrams of an exemplary base table and version store in accordance with the present invention.

Block diagrams of exemplary versions of rows in base table 210 and version store 220 are shown in FIGS. 3a-e. For example, as shown in FIG. 3a, the current version of row 101is stored in base table 210. The current version is assigned XID 30 and SEQ 1, which point to the first previous version of the row stored in version store 220. The first previous version of the row is assigned XID 20 and SEQ 1, which point to the second previous version of the row also stored in version store 220.

Figure 3B:
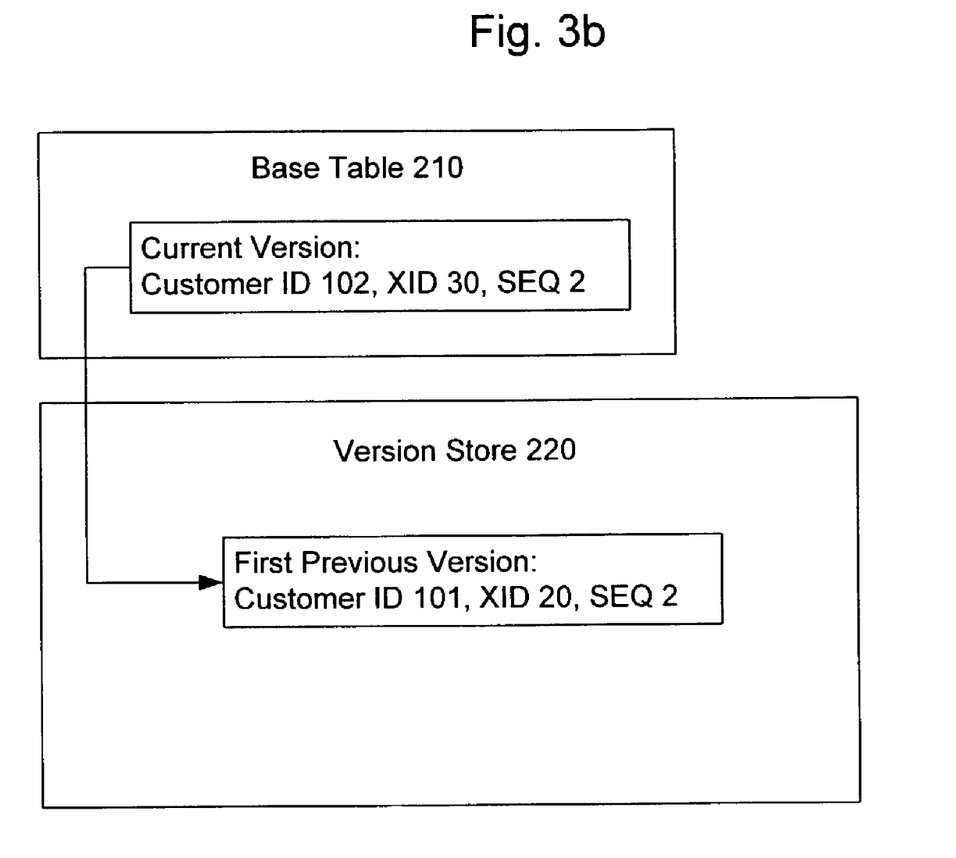

As shown in FIG. 3b, the current version of row 102is stored in base table 210. The current version is assigned XID 30 and SEQ 2, which point to the first previous version of the row stored in version store 220.

Figure 3C:
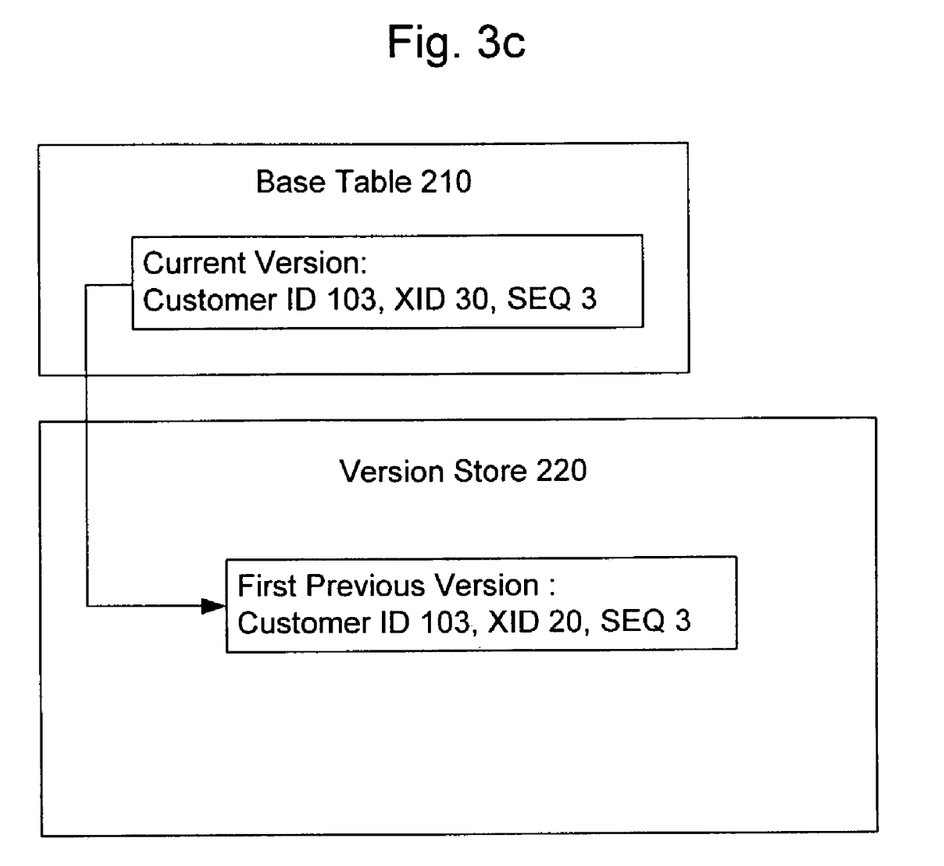

As shown in FIG. 3c, the current version of row 103, which is a ghost record, is stored in base table 210. The ghost record is a placeholder for a deleted record which does not include substantive data. The ghost record is assigned XID 30 and SEQ 3, which point to the first previous version of the row stored in version store 220.

Figure 3D:
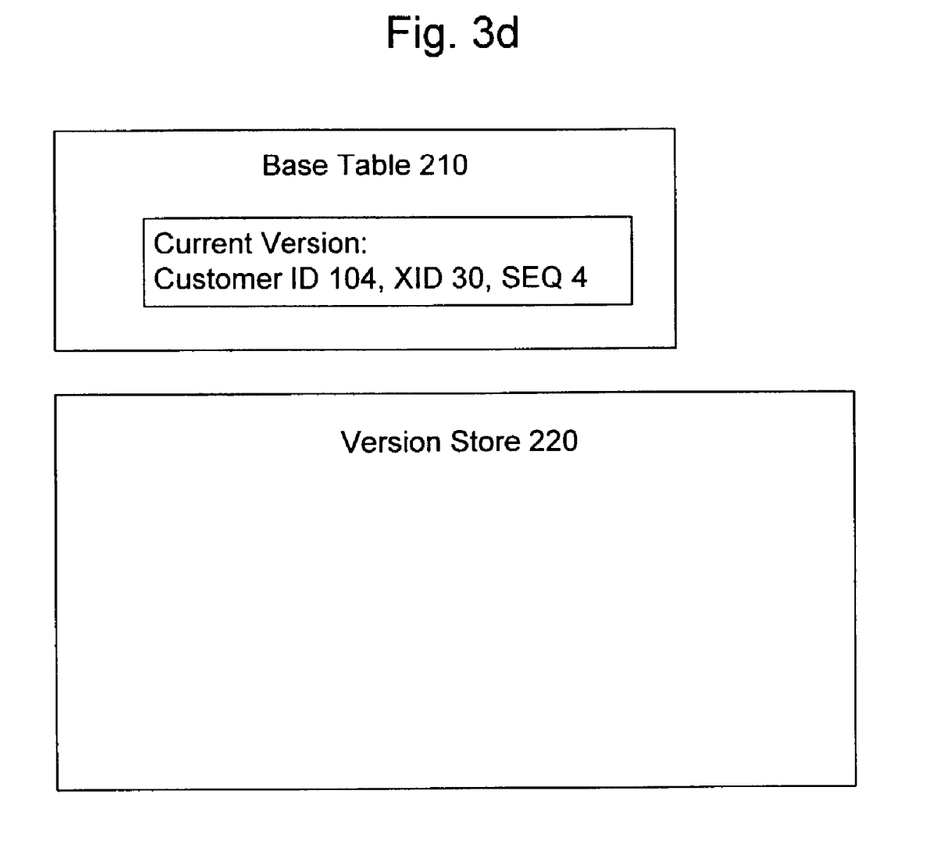
Figure 3E:
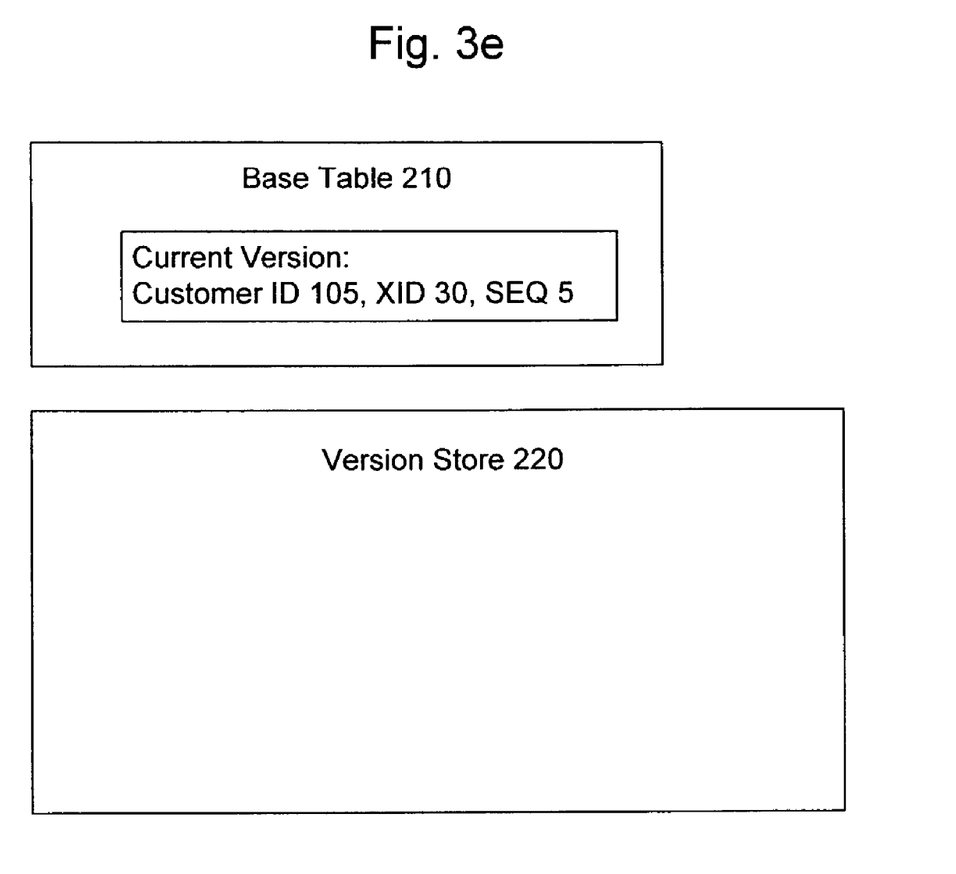

As shown in FIGS. 3d and 3e, the current version of rows 104and 105, respectively, are stored in base table 210. Because such rows are newly inserted, there is no previous version of them in version store 220. In an alternative embodiment, a unique marker with a predetermined unique SEQ value may be used to show that a row has been newly inserted. Such a unique marker would indicate that a previous version of the row is not stored in version store 220.

It is not required that version store 220 persist after crash of DBMS 200. Therefore, version store 220 may be stored in a temporary database of DBMS 200. Previous versions of rows are preferably stored only while queries accessing such rows may be executed, and, therefore, previous versions are periodically deleted from version store 220.

Version store 220 may be organized according to a tree structure such as, for example, a b tree or b+tree. The key for the b tree is preferably the XID and SEQ of each change. Rows organized according to a b tree may be range deleted according to their XID and SEQ values. For example, changes with an XID and SEQ within a specified range of XID's and SEQ's may be range deleted. Rows may be deleted following a single DML statement within a transaction or following a complete transaction or group of transactions.

Alternatively, version store 220 may be organized using a physical row ID or disk address to identify the previous version of each row. In such a row ID scheme, the Row ID of the previous version of each row preferably is stored in addition to the XID and SEQ. The previous versions are preferably stored in a set of disk pages referred to as "heaps". New heaps may be generated at a specified period. For example, a user may request that a new heap be generated every sixty seconds. A heap may be deleted after all transactions which generated versions stored in the heap are complete.

In addition to organizing version store 220, such tree structures and heaps may be used to organize base table 210. For example, if a row in base table 210 includes binary large object (BLOB) data, then such BLOB data may be broken down into fragments are stored in separate BLOB base table corresponding to the row. Such BLOB base tables are organized according to tree structures or heaps maintained by DBMS 200.

Delta table 230 identifies changes made in base table 210. An exemplary delta table preferably has two columns: the primary key column of base table 210 and a change column, which indicates whether the corresponding change is an insertion or a deletion.

Delta table 230 preferably identifies changes made by a corresponding data manipulation language (DML) statement. For example, if a DML statement made changes {XID 30, SEQ 2} through {XID 30, SEQ 4}, then a corresponding delta table 230 would preferably be generated as shown below in Table 3:

TABLE 3

| Primary Key | Change |
|---|---|
| 102 | Delete |
| 102 | Insert |
| 103 | Delete |
| 104 | Insert |

Table 3 includes the primary key value of changes {XID 30, SEQ 2} through {XID 30, SEQ 4} and indicates whether the corresponding change is an insertion or deletion. Table 4 indicates that row 102 has been modified, which involves both a deletion and an insertion. Table 3 also shows that row 103 has been deleted and row 104 has been inserted.

Transition tables 240 and 242 store the changes made to base table 210. Delete table 240 shows deleted from base table 210. An exemplary delete table 240 illustrating rows deleted by the exemplary DML statement described above is shown below in Table 4:

TABLE 4

| Customer ID | Name |
|---|---|
| 102 | Betty |
| 103 | Chris |

Insert table 242 stores rows inserted into base table 210. An exemplary insert table 242 illustrating rows inserted by the DML statement described above is shown below in Table 5.

TABLE 5

| Customer ID | Name |
|---|---|
| 102 | Bob |
| 104 | Dave |

Transition tables 240 and 242 are populated by identifying rows that are changed by a statement as part of a transaction. Generally, base table 210 is scanned with a delete marker and an insert marker. The delete marker identifies a last change committed to base table 210 as part of the transaction prior to execution of the statement, and the insert marker identifies a last change committed to base table 210 during execution of the statement. The results of the delete marker scan are filtered with the deletions stored in delta table 230, and delete table 240 is populated with the filtered rows. The results of the insert scan are filtered with the insertions stored in delta table 230, and insert table 242 is populated with the filtered rows.

Figure 4:
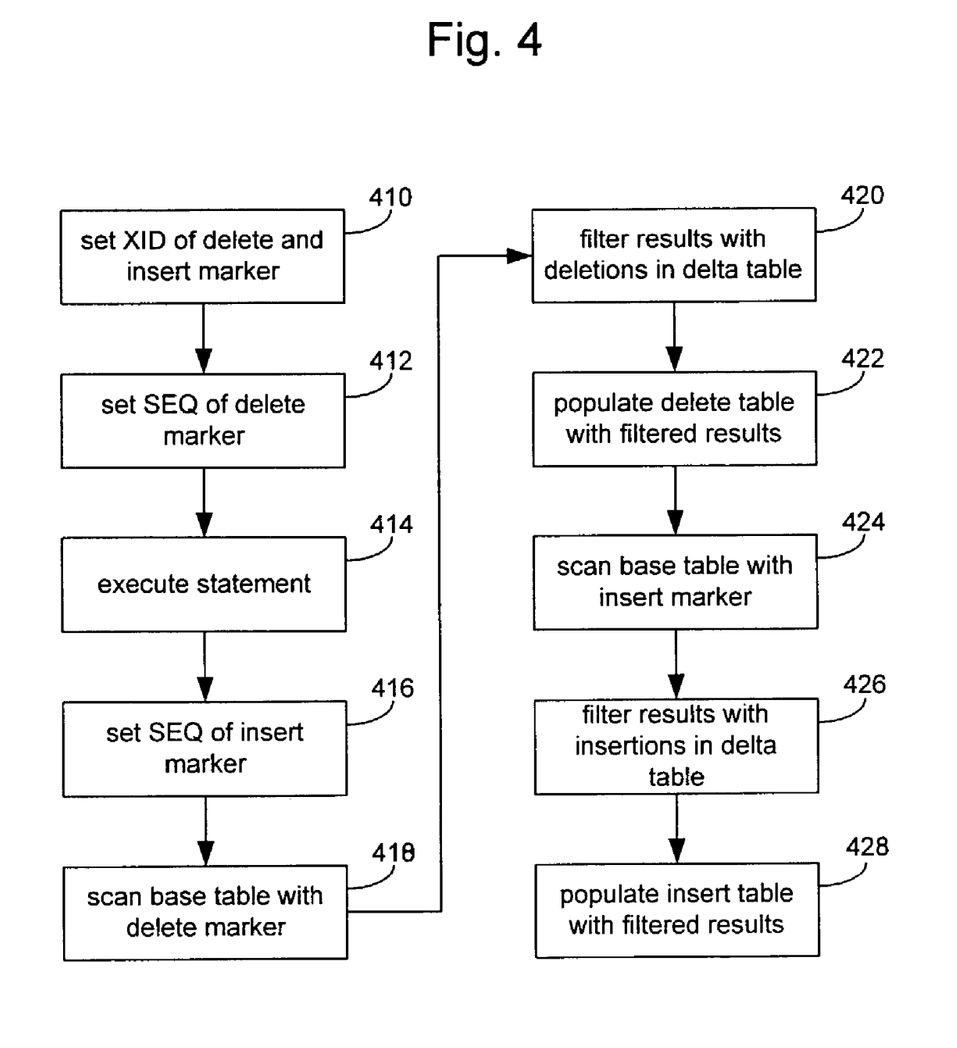
FIG. 4 is a flowchart of an exemplary method for identifying and storing changes in accordance with the present invention.

A flowchart of an exemplary method for identifying such rows is shown in FIG. 4. At step 410, the XID of the delete and insert markers are set to the identifier of the transaction. For example, the exemplary statement above was executed as part of transaction "30", and, therefore, the XID of the delete and insert markers is set to 30.

At step 412, the SEQ of the delete marker is set to the SEQ of the last change committed as part of the transaction. For example, the last change committed as part of transaction "30" prior to execution of the exemplary statement was assigned SEQ "1". Thus, the delete marker is set to: {(XID 30, SEQ 1)}.

At step 414, DBMS 200 executes the data manipulation language (DML) statement. The statement may be used to insert, delete, and/or modify rows in base table 210. For example, the exemplary statement above modified row 102, deleted row 103, and inserted row 104.

When a statement changes a particular row, the current version of the row is stored in base table 210 with the previous version of the row stored in version store 220. When the current version of the row is committed to base table 210, it is assigned XID and SEQ values which serve as a pointer to the previous version of the row. The XID value assigned to each change is the XID value for transaction set at step 410. The SEQ value identifies the sequence in which changes are made within the transaction. The SEQ is preferably a monotonically increasing value that is automatically maintained by DBMS 200. For example, the XID and SEQ values assigned to the first row changed by the exemplary statement, row 102, are {(XID 30, SEQ 2)} as shown above in Table 1. The next changed row, row 103, is, in turn, assigned {(XID 30, SEQ 3)}. The next changed row, row 104, is, in turn, assigned {(XID 30, SEQ 4)}.

At step 416, the SEQ of the insert marker is set to the SEQ of the last change committed as part of the transaction during execution of the statement. For example, the last row changed as part of transaction "30" during execution of the statement was row 104, which was assigned SEQ "4". Thus, the insert marker is set to: {(XID 30, SEQ 4)}.

At step 418, base table 210 is scanned with the delete marker. An exemplary method for scanning base table 210 is discussed in detail below with reference to FIG. 5. Results of performing such a scan on Table 2 with delete marker {(XID 30, SEQ 1)} are shown below in table 6:

TABLE 6

| Customer ID | Name | XID | SEQ |
|---|---|---|---|
| 101 | Andy | 30 | 1 |
| 102 | Betty | 20 | 2 |
| 103 | Chris | 20 | 3 |

At step 420, the results of the delete scan are filtered with the deletions stored in delta table 230, and, at step 422, delete table 240 is populated with the filtered rows. For example, if the rows in Table 6 are filtered with the deletions stored in Table 3, then delete table 240 will be populated as shown below in Table 7:

TABLE 7

| Customer ID | Name | XID | SEQ |
|---|---|---|---|
| 102 | Betty | 20 | 2 |
| 103 | Chris | 20 | 3 |

At step 424, base table 210 is scanned with the insert marker. An exemplary method for scanning base table 210 is discussed in detail below with reference to FIG. 5 Results of performing such a scan on Table 2 with insert marker {(XID 30, SEQ 4)} are shown below in Table 8:

TABLE 8

| Customer ID | Name | XID | SEQ |
|---|---|---|---|
| 101 | Andy | 30 | 1 |
| 102 | Bob | 30 | 2 |
| 103 |  | 30 | 3 |
| 104 | Dave | 30 | 4 |

At step 426, the results of the insert scan are filtered with the insertions stored in delta table 230, and, at step 428, insert table 242 is populated with the filtered rows. For example, if the rows in Table 8 are filtered with the insertions stored in Table 4, then insert table 242 will be populated as shown below in Table 9:

TABLE 9

| Customer ID | Name | XID | SEQ |
|---|---|---|---|
| 102 | Bob | 30 | 2 |
| 104 | Dave | 30 | 4 |

Thus, the process described above with respect to FIG. 4 identifies changes made by a DML statement and populates transition tables 240-242 with such changes. The process enables such changes to be identified by scanning base table 210 with an insert marker and a delete marker.

Figure 5:
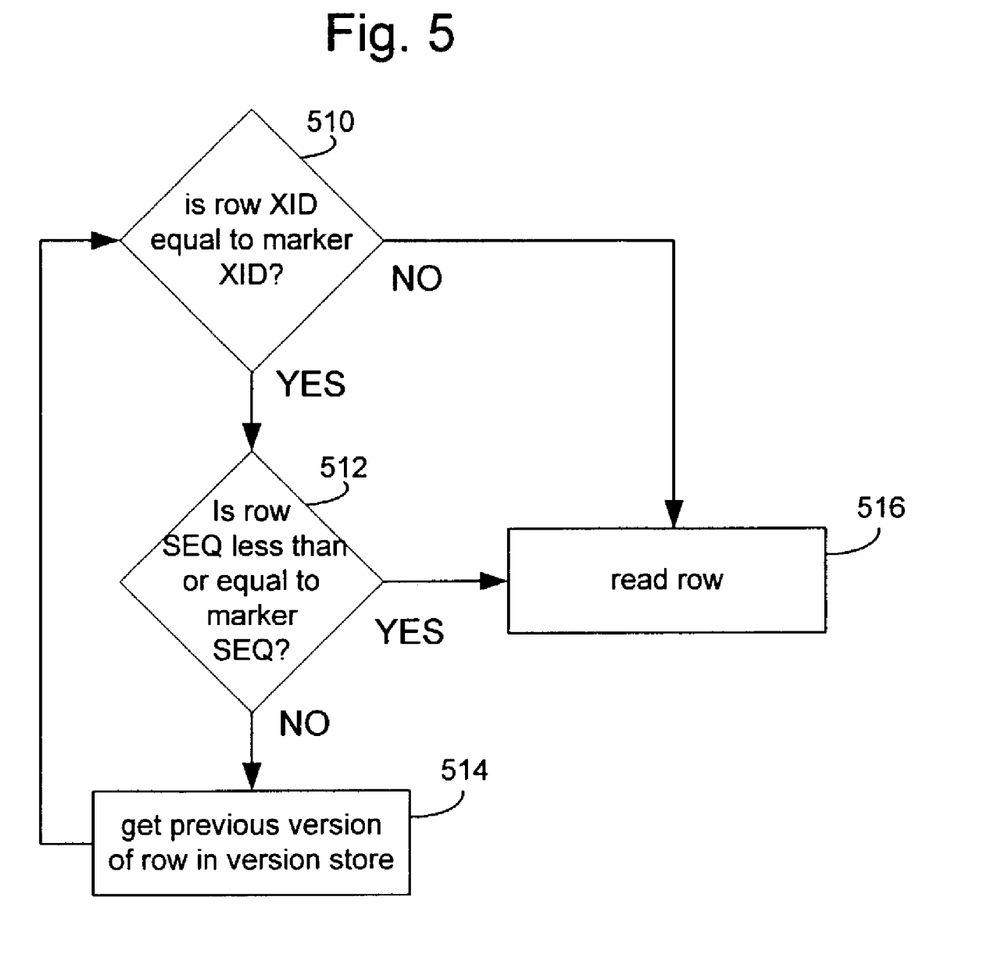
FIG. 5 is a flowchart of an exemplary method for scanning a table in accordance with the present invention.

A flowchart of an exemplary method for scanning base table 210 is shown in FIG. 5. Generally, the scan reads changes made as part of a different transaction and changes made as part of the same transaction occurring at or prior to the SEQ of the marker.

As shown in FIG. 5, at step 510, it is determined if the XID of the row is equal to the XID of the marker. If not, then, at step 516, the row is read. If so, then, at step 512, it is determined if the SEQ of the row is less than or equal to the SEQ of the marker. If so, then, at step 516, the row is read. If not, then, at step 514, the previous version of the row is retrieved from version store 220 and the method returns to step 510.

As discussed previously with respect to FIG. 4, after a row is read, it as added to the scan results and filtered with the rows stored in delta table 230. If a row that is read by the delete scan is also listed as a deletion in delta table 230, then the row will be stored in delete table 240. If a row that is read by the insert scan is also listed as an insertion in delta table 230, then the row will be stored in insert table 242. The tables discussed above with respect to FIGS. 4 and 5 may be stored in any storage device such as, for example, a memory or a database.

While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather should be construed in breadth and scope in accordance with the appended claims.

We claim:

1. A method implemented at least in part by a computer for identifying rows deleted from a base table by a data manipulation statement as part of a selected transaction, the method comprising:

examining each row of a plurality of rows in the base table to identify a last row changed as part of the transaction prior to execution of the statement, each said row having a row transaction number and a row sequence number, the row sequence number identifying a sequence in which changes are made within a transaction, each transaction being a sequence of changes that are committed;

generating a scan list comprising a delete marker having a marker transaction number and a marker sequence number, the marker transaction number being set to the transaction number of the selected transaction of the base table, the marker sequence number being set to a sequence number of the last row changed as part of the selected transaction prior to execution of the statement;

said examining further scanning each row in the base table with the delete marker that is set responsive to the last row changed as part of the transaction prior to execution of the statement, for each row:

(a) determining if the row transaction number is equal to the marker transaction number;

(b) if the row transaction number is not equal to the marker transaction number, then the row is read and added to the scan list;

(c) if the row transaction number is equal to the marker transaction number, then:

determining if the row sequence number is less than or equal to the marker sequence number;

if the row sequence number is less than or equal to the marker sequence number, then the row is read and added to the scan list;

if the row sequence number is not less than or equal to the marker sequence number, then retrieving a previous version of the row from a version store and returning to step (a) using the previous version of the row; and where retrieving the previous version of the row comprises retrieving a previous version of the row from the version store, the previous version identified in the version store by the row transaction number and the row sequence number;

filtering results in the scan list with identified insert changes stored in a delta table;

where the delta table stores a list of insertions made by the statement; and populating the filtered results of the scan list in a insert table.

2. A method implemented at least in part by a computer for identifying rows inserted into a base table by a data manipulation statement as part of a selected transaction, the method comprising:

examining each row of a plurality of rows in the base table to identify a last row changed as part of the transaction during the execution of the statement, each said row having a row transaction number and a row sequence number, the row sequence number identifying a sequence in which changes are made within a transaction, each transaction being a sequence of changes that are committed;

generating a scan list comprising an insert marker having a marker transaction number and a marker sequence number, the marker transaction number being set to the transaction number of the selected transaction of the base table, the marker sequence number being set to a sequence number of the last row changed as part of the selected transaction during execution of the statement;

said examining further scanning each row in the base table with the insert marker that is set responsive to the last row changed as part of the transaction during execution of the statement, for each row:

(a) determining if the row transaction number is equal to the marker transaction identifier;

(b) if the row transaction number is not equal to the marker transaction identifier, then the row is read and added to the scan list;

(c) if the row transaction number is equal to the marker transaction identifier, then:

determining if the row sequence number is less than or equal to the marker sequence number;

if the row sequence number is less than or equal to the marker sequence number, then the row is read and added to the scan list;

if the row sequence number is not less than or equal to the marker sequence number, then retrieving a previous version of the row from a version store and returning to step (a) using the previous version of the row; and where retrieving the previous version of the row comprises retrieving a previous version of the row from the version store, the previous version identified in the version store by the row transaction number and the row sequence number;

filtering results in the scan list with identified insert changes stored in a delta table;
where the delta table stores a list of insertions made by the statement; and populating the filtered results of the scan list in a insert table.

3. A system for identifying rows deleted from a base table by a data manipulation statement as part of a selected transaction, the system comprising:

a processor operative to execute computer executable instructions; and a memory having stored therein computer executable instructions for performing the following steps:

the base table comprising a plurality of rows in the base table to identify a last row changed as part of the transaction prior to execution of the statement, each said row having a row transaction number and a row sequence number, the row sequence number identifying a sequence in which changes are made within a transaction, each transaction being a sequence of changes that are committed;

generating a scan result list comprising a delete marker having a marker transaction number and a marker sequence number, the marker transaction number being set to the transaction number of the selected transaction of the base table, the marker sequence number being set to a sequence number of a last row changed as part of the selected transaction prior to execution of the statement;

said examining further scanning each row in the base table with the delete marker that is set responsive to the last row changed as part of the transaction prior to execution of the statement, for each row:

(a) determining if the row transaction number is equal to the marker transaction number;

(b) if the row transaction number is not equal to the marker transaction number, then the row is read and added to the scan list;

(c) if the row transaction number is equal to the marker transaction number, then:

determining if the row sequence number is less than or equal to the marker sequence number;

if the row sequence number is less than or equal to the marker sequence number, then the row is read and added to the scan list; and if the row sequence number is not less than or equal to the marker sequence number, then retrieving a previous version of the row from a version store and returning to step (a) using the previous version of the row;

where retrieving the previous version of the row comprises retrieving a previous version of the row from the version store, the previous version identified in the version store by the row transaction number and the row sequence number;

filtering results in the scan list with the identified delete changes stored in a delta where the delta table stores a list of deletions made by the statement; and populating the filtered results of the scan list in a delete table.

4. The system of claim 3, wherein the base table is for storing current versions of the rows.

5. The system of claim 3, wherein the version store is for storing previous versions of the rows.

6. The system of claim 3, further comprising a delete table for storing rows deleted by the statement.

7. A system for identifying rows inserted into a base table by a data manipulation statement as part of a selected transaction, the system comprising:

a processor operative to execute computer executable instructions; and a memory having stored therein computer executable instructions for performing the following steps:

a data storage device for storing the base table, a version store, a delta table and an insert table;

examining each row of a plurality of rows in the base table to identify a last row changed as part of the transaction during the execution of the statement, each said row having a row transaction number and a row sequence number, the row sequence number identifying a sequence in which changes are made within a transaction, each transaction being a sequence of changes that are committed;

generating a scan result list comprising an insert marker having a marker transaction number and a marker sequence number, the marker transaction number being set to the transaction number of the selected transaction of the base table, the marker sequence number being set to a sequence number of a last row changed as part of the selected transaction during execution of the statement;

said examining further scanning each row in the base table with the insert marker that is set responsive to the last row changed as part of the transaction during execution of the statement, for each row:

(a) determining if the row transaction number is equal to the marker transaction identifier;

(b) if the row transaction number is not equal to the marker transaction identifier, then the row is read and added to the scan list;

(c) if the row transaction number is equal to the marker transaction identifier, then:

determining if the row sequence number is less than or equal to the marker sequence number;

if the row sequence number is less than or equal to the marker sequence number, then a row is read and added to the scan list;

if the row sequence number is not less than or equal to the marker sequence number, then retrieving a previous version of the row from a version store and returning to step (a) using the previous version of the row;

where retrieving the previous version of the row comprises retrieving a previous version of the row from the version store, the previous version identified in the version store by the row transaction number and the row sequence;

filtering results in the scan list with identified insert changes stored in a delta table;

where the delta table stores a list of insertions made by the statement; and populating the filtered results of the scan list in a insert table.

8. The system of claim 7, wherein the base table is for storing current versions of rows.

9. The system of claim 7, wherein the version store is for storing previous versions of rows.

10. The system of claim 7, further comprising the delta table for storing a list of changes made by the statement.

11. The system of claim 7, further comprising an insert table for storing rows inserted by the statement.

12. A computer readable storage medium containing computer executable instructions for identifying rows deleted from a base table by a data manipulation statement as part of a selected transaction, the computer readable medium having stored thereon computer readable instructions such that when executed by a processor performs the following steps:
examining each row of a plurality of rows in the base table to identify a last row changed as part of the transaction prior to execution of the statement, each said row having a row transaction number and a row sequence number, the row sequence number identifying a sequence in which changes are made within a transaction, each transaction being a sequence of changes that are committed;
generating a scan list comprising a delete marker having a marker transaction number and a marker sequence number, the marker transaction number being set to the transaction number of the selected transaction of the base table, the marker sequence number being set to a sequence number of a last row .changed as part of the selected transaction prior to execution of the statement;
said examining further scanning each row in the base table with the delete marker that is set responsive to the last row changed as part of the transaction prior to execution of the statement, for each row:
(a) determining if the row transaction number is equal to the marker transaction number;
(b) if the row transaction number is not equal to the marker transaction number, then the row is read and added to the scan list;
(c) if the row transaction number is equal to the marker transaction number, then:
determining if the row sequence number is less than or equal to the marker sequence number;
if the row sequence number is less than or equal to the marker sequence number, then the row is read and added to the scan list; and
if the row sequence number is not less than or equal to the marker sequence number, then retrieving a previous version of the row from a version store and returning to step (a) using the previous version of the row;
where the retrieving the previous version of the row comprises retrieving a previous version of the row from the version store, the previous version identified in the version store by the row transaction number and the row sequence number;
filtering results in the scan list with identified delete changes stored in a delta table;
where the delta table stores a list of deletions made by the statement; and
populating the filtered results of the scan list in a delete table.

13. A computer readable storage medium containing computer executable instructions for identifying rows inserted into a base table by a data manipulation statement as part of a selected transaction, the computer readable medium having stored thereon computer readable instructions such that when executed by a processor performs the following steps:
examining each row of a plurality of rows in the base table to identify a last row changed as part of the transaction during the execution of the statement, each said row having a row transaction number and a row sequence number, the row sequence number identifying a sequence in which changes are made within a transaction, each transaction being a sequence of changes that are committed;
generating a scan list comprising an insert marker having a marker transaction number and a marker sequence number, the marker transaction number being set to the transaction number of the selected transaction of the base table, the marker sequence number being set to a sequence number of the last row changed as part of the selected transaction during execution of the statement;
said examining further scanning each row in the base table with the insert marker that is set responsive to the last row changed as part of the transaction during execution of the statement, for each row:
(a) determining if the row transaction number is equal to the marker transaction identifier;
(b) if the row transaction number is not equal to the marker transaction identifier, then the row is read and added to the scan list;
(c) if the row transaction number is equal to the marker transaction identifier, then:
determining if the row sequence number is less than or equal to the marker sequence number;
if the row sequence number is less than or equal to the marker sequence number, then the row is read and added to the scan list;
if the row sequence number is not less than or equal to the marker sequence number, then retrieving a previous version of the row from a version store and returning to step (a) using the previous version of the row; and
where retrieving the previous version of the row comprises retrieving a previous version of the row from the version store, the previous version identified in the version store by the row transaction number and the row sequence number:
filtering results in the scan list with identified insert changes stored in a delta table;
where the delta table stores a list of insertions made by the statement; and
populating the filtered results of the scan list in a insert table.

* * * * *

UNITED STATES PATENT AND TRADEMARK OFFICE
CERTIFICATE OF CORRECTION

PATENT NO. : 7,333,992 B2  
APPLICATION NO. : 10/445095  
DATED : February 19, 2008  
INVENTOR(S) : Ganapathy Krishnamoorthy et al.

It is certified that error appears in the above-identified patent and that said Letters Patent is hereby corrected as shown below:

In column 10, line 7, in Claim 1, after "list;" insert -- and --.

In column 10, line 12, in Claim 1, after "row;" delete "and".

In column 10, line 17, in Claim 1, after "number;" insert -- and --.

In column 10, line 18, in Claim 1, delete "insert" and insert -- delete --, therefor.

In column 10, line 20, in Claim 1, after "list of" delete "insertions" and insert -- deletions --, therefor.

In column 10, line 22, in Claim 1, after "list in a" delete "insert" and insert -- delete --, therefor.

In column 11, line 59, in Claim 3, after "delta" insert -- table; --.

In column 13, line 21, in Claim 12, after "last row" delete ".changed" and insert -- changed --, therefor.

Signed and Sealed this  
Twenty-second Day of February, 2011

David J. Kappos  
*Director of the United States Patent and Trademark Office*